United States Patent [19]

Dumbaugh, Jr.

[11] Patent Number: 5,116,788
[45] Date of Patent: May 26, 1992

[54] ALKALINE EARTH ALUMINOBOROSILICATE GLASSES FOR FLAT PANEL DISPLAYS

[75] Inventor: William H. Dumbaugh, Jr., Painted Post, N.Y.

[73] Assignee: Corning Incorporated, Corning, N.Y.

[21] Appl. No.: 743,800

[22] Filed: Aug. 12, 1991

[51] Int. Cl.$^5$ .................... C03C 3/085; C03C 3/091
[52] U.S. Cl. .................... 501/66; 340/719; 359/82; 501/69
[58] Field of Search .................... 501/66, 69; 340/719; 359/82

[56] References Cited

U.S. PATENT DOCUMENTS 4,634,683 1/1987 Dumbaugh, Jr. .................... 501/69
4,634,684 1/1987 Dumbaugh, Jr. .................... 501/69
4,824,808 4/1989 Dumbaugh, Jr. .................... 501/66
4,994,415 2/1991 Imai et al. .................... 501/66

Primary Examiner—Mark L. Bell
Attorney, Agent, or Firm—C. S. Janes, Jr.

[57] ABSTRACT

This invention is directed to the production of glass substrates for use in flat panel display devices employing polycrystalline silicon thin film transistors. The compositions for these glasses are essentially free from alkali metal oxides and consist essentially, in mole percent of:

| $SiO_2$ | 60-65 | MgO | 0-4 |
|---|---|---|---|
| $Al_2O_3$ | 8-10 | SrO | 0-12 |
| $B_2O_3$ | 1-4 | BaO | 0-9 |
| CaO | 11-24 | CaO + MgO + SrO + BaO | 23-28 |

2 Claims, No Drawings

ALKALINE EARTH ALUMINOBOROSILICATE GLASSES FOR FLAT PANEL DISPLAYS

RELATED APPLICATIONS

U.S. application Ser. No. 07/743,799, filed concurrently herewith in the name of W. H. Dumbaugh, Jr. under the title HIGH ALUMINA, ALKALINE EARTH BOROSILICATE GLASSES FOR FLAT PANEL DISPLAYS, is directed to glasses designed for use as substrates in flat panel display devices utilizing polycrystalline silicon thin film transistors. The glasses disclosed therein exhibited strain points higher than 625° C., liquidus temperatures below 1075° C., long term stability against devitrification, liquidus viscosities greater than $1.5 \times 10^5$ compositions essentially free from alkali metal oxides and MgO, while consisting essentially, in mole percent, of:

| $SiO_2$ | 63-68 | BaO | 4.5-10 |
|---|---|---|---|
| $Al_2O_3$ | 7.5-11 | CaO + SrO + BaO | 14-26 |
| CaO | 9.5-16 | $B_2O_3$ | 1-7 |
| SrO | 0-5 | | |

U.S. application Ser. No. 07/743,802, filed concurrently herewith in the names of W. H. Dumbaugh, Jr. and J. C. Lapp under the title STRONTIUM ALUMINOSILICATE GLASSES FOR FLAT PANEL DISPLAYS is likewise directed to glasses designed for use as substrates in liquid crystal display, devices utilizing polycrystalline silicon thin film transistors. The glasses disclosed therein exhibit strain points higher than 675° C., linear coefficients of thermal expansion over the temperature range 25°-300° C. between $45-62 \times 10^{-7}$/° C., long term stability against devitrification, liquidus viscosities greater than $1.5 \times 10^5$ poises, and have compositions essentially free from alkali metal oxides and MgO, while consisting essentially, in mole percent, of:

| $SiO_2$ | 65-75 | BaO and/or CaO | 0-10 |
|---|---|---|---|
| $Al_2O_3$ | 6-10 | $B_2O_3$ | 0-5 |
| SrO | 15-26 | [BaO and/or CaO] + $B_2O_3$ | 0-12 |

BACKGROUND OF THE INVENTION

Glass has been chosen as a substrate in liquid crystal display devices for at least three reasons: first, it is transparent; second, it can withstand the chemical and physical conditions to which it is exposed during display processing; and third, it can be manufactured at reasonable cost in thin sheets with precisely controlled dimensions. Liquid crystal displays are passive displays which are dependent upon external sources of light for illumination. They are fabricated as segmented displays or in one of two basic matrix configuration. The needs of the two types of substrates differ. The first type is intrinsic matrix addressed, relying upon the threshold properties of the liquid crystal material. The second type is extrinsic matrix or active matrix addressed in which an array of diodes, metal-insulator-metal devices, or thin film transistors (TFTs) supplies an electronic switch to each pixel. In both designs, however, two sheets of glass form the structure of the display.

Intrinsically addressed liquid crystal displays are fabricated employing thin film deposition at temperatures of about 350° C., followed by photolithographic patterning. Because of the low temperature requirements involved in the process, soda lime silicate glass having a silica barrier layer thereon to prevent migration of Na+ ions has been used extensively as substrates therefor. A higher performance version of intrinsically addressed liquid crystal displays, termed the super twisted nematic, has an added substrate requirement, viz., extremely precise flatness. That requirement has demanded that the soda lime silicate glass employed in those displays be polished. Alternatively, Corning Code 7059 glass, a barium boroaluminosilicate glass marketed by Corning Incorporated, Corning, N.Y., which is precision formed into sheet requiring no surface polishing utilizing the downdraw fusion pipe, such as is described in U.S. Pat. Nos. 3,338,696 (Dockerty) and 3,682,609 (Dockerty), has been employed.

Extrinsically addressed liquid crystal displays can be subdivided into two categories: the first based upon metal-insulator-metal or amorphous silicon (a-Si) devices; and the second based upon polycrystalline silicon (poly-Si) devices. Devices formed from poly-Si are processed at substantially higher temperatures than those employed with a-Si thin film transistors. Those temperatures have demanded the use of glasses hibiting higher strain points than soda lime silicate glasses and Corning Code 7059 glass to preclude thermal deformation of the sheet during processing. The lower the strain point of the glass, the greater this dimensional change. A practical solution to that problem is to develop glasses demonstrating high strain points so that the dimensional change is minimized during device processing at temperatures of about 600° C.

Contamination of thin film transistors by Na+ ions migrating from the glass substrate is a major concern during processing. That problem has led to the use of a coating on the substrate glass to provide a barrier against migrating of any alkali.

Therefore, glasses suitable as candidates for substrates in liquid crystal display devices utilizing poly-Si thin film transistors must comply with the following needs:

(1) the glass composition will be essentially free from alkali metal oxides;

(2) the glass must be relatively inert to the chemicals used in display processing; and (3) the glass must demonstrate a strain point of at least 625° C. and preferably much higher.

The glasses disclosed in Ser. No. 07/743,799 and Ser. No. 07/743,802 were designed to be used in forming sheet via the downdraw fusion pipe process and, hence, required compositions exhibiting a viscosity at the liquidus temperature greater than about $1.5 \times 10^5$ poises.

SUMMARY OF THE INVENTION

The present ;invention was designed to produce glasses demonstrating the high strain points and excellent chemical durability displayed by the glasses of those two applications, but which would exhibit lower melting viscosities than those glasses. Such lower melting viscosities would permit the manufacture of precision flat glass sheeting in an economical manner by an alternate forming process, for example, the float process. The lower liquidus viscosities of the glasses render them prone to devitrification when used in the downdraw fusion pipe process.

I have found a narrow range of glass compositions within the alkaline earth metal aluminoborosilicate system wherein the products exhibit strain points in excess of 675° C., an internal liquidus temperature below 1125° C., a viscosity at the liquidus temperature between $2 \times 10^4$–$10^5$ poises, a viscosity of 100 poises at temperatures below 155° C., and excellent chemical durability as evidenced by a weight loss of less than 1 mg/cm$^2$ when immersed for 24 hours in an aqueous 5% by weight HCl solution operating at 95° C. Those compositions are essentially free from alkali metal oxides and consist essentially, expressed in terms of mole percent on the oxide basis, of:

| | | | |
|---|---|---|---|
| SiO$_2$ | 60–65 | MgO | 0–4 |
| Al$_2$O$_3$ | 8–10 | SrO | 0–12 |
| B$_2$O$_3$ | 1–4 | BaO | 0–9 |
| CaO | 11–24 | CaO + MgO + SrO + BaO | 23–28 |

As used herein, essentially free from alkali metal oxides means that no alkali metal-containing material was purposefully included as a batch material.

It is very difficult to evaluate in the laboratory the tendency of a glass to devitrify under various operating conditions. As a first approximation, a "liquidus" measurement is used. In reality, however, because of the method used in the laboratory, the measurement is not a true liquidus. Thus, the measuring technique involves placing crushed glass in a platinum boat which is then introduced into a gradient furnace having a temperature spread spanning the range wherein the liquidus is though to be located. After 24 hours the boat is removed from the furnace, allowed to cool, the glass removed therefrom, thin sections prepared from the glass, and those thin sections examined microscopically. A measurement is made of the maximum temperature at which "liquidus" temperature provides the first estimate as to whether a particular glass is close to acceptability.

At least 60% SiO$_2$ is demanded to assure the desired acid durability to the glasses. Nevertheless, higher SiO$_2$ contents increase the melting viscosity of the glass so 65% SiO is deemed to be a practical maximum.

B$_2$O$_3$ imparts greater fluidity to the glasses, both at high and low temperatures Therefore, at least 1% will be included, but more than 4% adversely impacts the acid durability and the strain point of the glasses.

The concentration of Al$_2$O$_3$ exerts a significant effect upon the liquidus of the glasses To maintain a liquidus temperature below 1125° C. and a viscosity at the liquidus temperature between $2 \times 10^4$–$10^5$ poises, the Al$_2$O$_3$ level will be held between 8–10%. At Al$_2$O$_3$ contents below 8%, the liquidus temperature can rise and the strain point is reduced.

The ratio of the alkaline earth metal oxides one to another is used to modify the melting and forming properties of the glasses. However, the total molar alkaline earth metal oxide content must be greater than 22% to provide fluidity at melting temperatures The key principle involved is the capability of the alkaline earth metal ions to increase the slope of the viscosity temperature curve, thereby giving a high strain point with a relatively low melting viscosity.

Whereas it is not possible mathematically to precisely convert mole percent to weight percent, the following ranges represent approximations of the inventive glass compositions in terms of weight percent:

| | | | |
|---|---|---|---|
| SiO$_2$ | 53–61 | MgO | 0–3 |
| Al$_2$O$_3$ | 12–15 | SrO | 0–14 |

-continued

| | | | |
|---|---|---|---|
| B$_2$O$_3$ | 1–4 | BaO | 0–12 |
| CaO | 12–21 | CaO + MgO + SrO + BaO | 24–32 |

PRIOR ART

U.S. Pat. No. 2,010,836 (Adams et al.) discloses glasses consisting essentially, in weight percent, of:

| | | | |
|---|---|---|---|
| SiO$_2$ | 25–45 | Al$_2$O$_3$ | 15–25 |
| R$_2$O | 0–2.5 | ZnO | ≧5 |
| CaO | 12–27 | B$_2$O$_3$ | 5–12 |

The levels of Al$_2$O$_3$ and B$_2$O$_3$ are higher than those required in the present inventive compositions and that of SiO$_2$ is lower than required.

U.S. Pat. No. 2,135,662 (Hanlein et al.) recites a glass composition consisting essentially, in weight percent, of:

| | | | |
|---|---|---|---|
| SiO$_2$ | 35 | CaO | 15 |
| Al$_2$O$_3$ | 30 | BaO | 10 |
| B$_2$O$_3$ | 10 | | |

The concentrations of Al$_2$O$_3$ and B$_2$O$_3$ are too high and that of SiO$_2$ too low.

U.S. Pat. No. 3,022,183 (Duncan et al.) describes glasses consisting essentially, in weight percent, of:

| | | | |
|---|---|---|---|
| SiO$_2$ | 43–49 | CaO | 7–12 |
| Al$_2$O$_3$ | 19–26 | BaO | 6–12 |
| B$_2$O$_3$ | 4–10 | R$_2$O | 0.1–2 |
| MgO | 5–8 | As$_2$O$_3$ | 0.7–1.1 |

The amounts of SiO$_2$ and CaO are too low and that of Al$_2$O$_3$ too high.

U.S. Pat. No. 3,310,413 (Harrington) is concerned with glasses consisting essentially, in weight percent, of:

| | | | |
|---|---|---|---|
| SiO$_2$ | 53.5–59.5 | MgO | 0–5.0 |
| Al$_2$O$_3$ | 13.0–16.5 | BaO | 5.5–16.5 |
| B$_2$O$_3$ | 4.0–9.0 | CaO | 8.5–15.0 |

The level of B$_2$O$_3$ is generally higher than the maximum permitted in the present inventive glasses and the CaO content generally lower. None of the working examples reported in the patent had a composition coming within the ranges of the subject inventive glasses. Furthermore, there is no requirement that the total alkaline earth metal oxide content be maintained within 22–28 mole percent.

U.S. Pat. No. 3,496,401 (Dumbaugh, Jr.) discusses glasses consisting essentially, in weight percent, of:

| | | | |
|---|---|---|---|
| SiO$_2$ | 55–70 | MgO + CaO + SrO + BaO | 10–25 |
| Al$_2$O$_3$ | 13–25 | B$_2$O$_3$ | 0–10 |

Whereas those broad ranges can partially overlap the composition intervals of the instant inventive glasses, there is not even an allusion to substrates for liquid crystal display devices, and none of the working examples provided in the patent had a composition coming within the ranges of the present inventive glasses.

U.S. Pat. No. 3,978,362 (Dumbaugh, Jr. et al.) reports glass compositions consisting essentially, in weight percent, of:

| $SiO_2$ | 58–63 | MgO | 0–5 |
|---|---|---|---|
| $Al_2O_3$ | 13–16 | BaO | 0–7 |
| CaO | 14–21 | CaO + MgO + BaO | $\geq 19$ |

$B_2O_3$ is stated to be preferably absent and none of the working examples provided had a composition coming within the ranges of the present inventive glasses.

U.S. Pat. No. 4,060,423 (Thomas) records glasses consisting essentially, in weight percent, of:

| $SiO_2$ | 55–68 | CaO | 7–13 |
|---|---|---|---|
| $Al_2O_3$ | 15–18 | BaO | 6–16 |

$B_2O_3$ is stated to be absent.

U.S. Pat. No. 4,180,618 (Alpha et al.) describes the fabrication of electronic devices comprised of a thin film of silicon deposited onto a glass substrate, the glass consisting essentially, in weight percent, of 55–75% $SiO_2$, 5–25% $Al_2O_3$, and at least one alkaline earth metal oxide selected from the group in the indicated proportions of 9–15% CaO, 14–20% SrO, and 18–26% BaO. $B_2O_3$ comprised no part of the composition and, even ignoring the absence of $B_2O_3$, no working example provided in the patent had a composition coming within the ranges of the instant inventive glasses.

U.S. Pat. No. 4,255,198 (Danielson et al.) relates to glasses consisting essentially, in weight percent, of:

| $SiO_2$ | 61–65 | SrO | 6–9 |
|---|---|---|---|
| $Al_2O_3$ | 14–17 | MgO | 0–5 |
| CaO | 8–15 | BaO | 0–5 |

$B_2O_3$ is nowhere referred to as a component of those glasses. Moreover, the level of $Al_2O_3$ is generally higher than the maximum employed in the present inventive glasses.

U.S. Pat. No. 4,302,250 (Danielson) is directed to glasses consisting essentially, in weight percent, of:

| $SiO_2$ | 64–68 | SrO | 0–4 |
|---|---|---|---|
| $Al_2O_3$ | 16.5–18.5 | BaO | 0–5 |
| CaO | 11–14 | SrO + BaO | 2–6.5 |

$B_2O_3$ is not mentioned as a possible component of those glasses. Furthermore, both the $SiO_2$ and $Al_2O_3$ are present in concentrations higher than the maximum of each permitted in the subject inventive glasses.

U.S. Pat. No. 4,394,453 (Dumbaugh, Jr.) is drawn to glasses consisting essentially, in weight percent, of:

| $SiO_2$ | 60.0 ± 1.5 | CaO | 11.4 ± 0.8 |
|---|---|---|---|
| $Al_2O_3$ | 17.0 ± 1.0 | MgO | 7.5 ± 0.8 |
| $B_2O_3$ | 5.0 ± 0.8 | | |

The levels of $Al_2O_3$, $B_2O_3$, and MgO are greater than can be tolerated in the present inventive glasses.

U.S. Pat. No. 4,409,337 (Dumbaugh, Jr.) refers to glasses consisting essentially, in weight percent, of:

| $SiO_2$ | 56–59 | CaO | 7.5–9.25 |
|---|---|---|---|
| $Al_2O_3$ | 16–17 | MgO | 5.5–6.25 |
| $B_2O_3$ | 4.5–5.25 | BaO | 5–9 |

The concentration of CaO is less than and that of MgO more than the amounts of each required in the instant inventive glasses.

U.S. Pat. No. 4,441,051 (Thomas) discloses glasses consisting essentially, in weight percent, of:

| $SiO_2$ | 52–60 | CaO | 8–12 |
|---|---|---|---|
| $Al_2O_3$ | 11–17 | $B_2O_3$ | 3–7 |
| BaO | 11–16 | Alkali Metal Oxides | 0–3 |

No reference is made to glass substrates in liquid crystal displays, the concentration of CaO is less than the minimum required in the present inventive glasses, and the suggested inclusion of up to 3% alkali metal oxides is directly contrary to the demand of the subject inventive glasses that they be free from alkali metal oxides.

U.S. Pat. No. 4,824,808 (Dumbaugh, Jr.) describes glasses for use as substrates for liquid crystal displays consisting essentially in cation percent, of 52–58% $SiO_2$, 20–23% $B_2O_3$, 0–4% MgO, 0–6% CaO, 0–6% SrO, 1–9% BaO, 8–12% MgO+CaO+SrO+BaO, 0–3% ZnO, and 0–1% fining agent. The $B_2O_3$ contents are much too high and the CaO contents much too low to be operable in the present inventive glasses.

U.S. Pat. No. 4,994,415 (Imai) relates to glasses suitable for use as substrates in liquid crystal display devices consisting essentially, in weight percent, of:

| $SiO_2$ | 52–60 | BaO | 10–22 |
|---|---|---|---|
| $Al_2O_3$ | 7–14 | SrO | 0–10 |
| $B_2O_3$ | 3–12 | ZnO | 0–10 |
| CaO | 3–13 | | |

The preferred glass compositions contained 0.5–7% ZnO. ZnO flattens the viscosity-temperature curve, thereby undesirably lowering the strain point (none of the working examples provided in the patent had a strain point as high as 640° C.) while increasing melting viscosity. Moreover, the CaO concentrations of the patented glasses are generally lower than desired in the subject inventive compositions.

DESCRIPTION OF PREFERRED EMBODIMENTS

Table I below records a group of glass compositions, expressed in terms of parts by weight on the oxide basis, illustrating the compositional parameters of the instant invention. Inasmuch as the sum of the individual constituents totals or very closely approximates 100, for all practical purposes the tabulated values may be deemed to represent weight percent. The actual batch ingredients may comprise any materials, either oxides or other compounds, which, when melted together with the other batch ingredients, will be converted into the desired oxide in the proper proportions. For example, $CaCO_3$ and $H_3BO_3$ can provide the source of CaO and $B_2O_3$, respectively.

The batch components were compounded, tumble mixed together thoroughly to assist in preparing a homogeneous melt, and charged into platinum crucibles. After placing lids thereon, the crucibles were moved into a furnace operating at about 1600° C. and the batches melted for about 16 hours. Subsequently, the crucibles were removed from the furnace, the melts poured onto steel plates to produce glass slabs having dimensions of about 30cm×15cm×1cm, and those slabs introduced immediately into an annealer operating at about 750° C.. (The Examples labelled 7059, 1733, and 1724 refer to glasses commercially marketed by Corning Incorporated and are included as comparative examples.)

Although the above description is reflective only of research conducted in a laboratory, it must be understood that the inventive glasses are capable of being melted and formed utilizing large scale, commercial glass melting and forming equipment. Also, whereas not employed in the laboratory melts, conventional fining agents, e.g., $As_2O_3$ and $Sb_2O_3$, can be incorporated in the batches where deemed desirable.

Table I also reports measurements of several physical properties as well as the acid durability of the glasses as determined in accordance with techniques conventional in the glass art. Accordingly, the annealing point (A.P.), the strain point (St.P), the temperature at which the glass exhibits a viscosity of 100 poises (100), and the internal liquidus temperature (Liq.) using a platinum boat are tabulated in ° C.. Also listed are the viscosity of the glass at the liquidus temperature (Vis.) in terms of $10^4$ poises and an evaluation of the resistance of the glasses to attack by acids as evidenced by measuring the weight loss (W. L.) in terms of $mg/cm^2$ after an immersion for 24 hours in a bath of 5% by weight aqueous solution of HCl, the bath operating at a temperature of 95° C.

Table II records the exemplary glass compositions of Table I in terms of mole percent. RO represents the total of $CaO+MgO+SrO+BaO$.

exhibiting the desired properties. As can be observed in the comparative examples, compositions outside of the required ranges do not yield the desired high strain points and/or viscosity relationships.

The more preferred composition intervals of the subject inventive glasses consist essentially, in mole percent, of:

| $SiO_2$ | 61-64 | MgO | 0-3 |
|---|---|---|---|
| $Al_2O_3$ | 8-9 | SrO | 0-9 |
| $B_2O_3$ | 1-3 | BaO | 0-7 |
| CaO | 12-22 | CaO + MgO + SrO + BaO | 25-26 |

Examples 1 and 2 comprise the most preferred glass composition.

Whereas the present invention has been described in detail utilizing the inventive glasses as substrates in liquid crystal display devices, it will be understood that can be employed in other flat panel display devices such as electroluminescent displays and plasma displays.

I claim:

1. In a flat panel display device containing a flat, transparent glass substrate carrying polycrystalline silicon thin film transistors, the improvement wherein said glass exhibits a strain point over 675° C., a liquidus temperature below 1125° C., a viscosity at the liquidus temperature between $2\times10^4$-$10^5$ poises, a viscosity of 100 poises at temperatures below 1550° C., and a weight loss of less than 1 $mg/cm^2$ after immersion for 24 hours in an aqueous 5% by weight HCl solution at 95° C., said glass being essentially free from alkali metal oxides and consisting essentially, expressed in terms of mole percent on the oxide basis, of:

| $SiO_2$ | 60-65 | MgO | 0-4 |
|---|---|---|---|

TABLE I

| | 1 | 2 | 3 | 4 | 5 | 6 | 7059 7 | 1724 8 | 1733 9 | 10 | 11 |
|---|---|---|---|---|---|---|---|---|---|---|---|
| $SiO_2$ | 57.2 | 56.9 | 57.7 | 55.0 | 58.6 | 58.7 | 50.0 | 56.8 | 57.0 | — | — |
| $Al_2O_3$ | 13.5 | 13.5 | 13.6 | 13.0 | 13.8 | 13.9 | 10.0 | 16.4 | 15.2 | — | — |
| $B_2O_3$ | 2.23 | 2.22 | 2.25 | 2.15 | 2.28 | 2.29 | 15.0 | 4.7 | 12.4 | — | — |
| CaO | 16.4 | 18.2 | 16.6 | 14.0 | 18.7 | 18.8 | — | 7.8 | 3.9 | — | — |
| MgO | 1.34 | — | — | — | 0.11 | — | — | 5.8 | 1.4 | — | — |
| SrO | 0.19* | 0.15* | 9.61 | 5.85 | 6.24 | 6.25 | — | — | 3.6 | — | — |
| BaO | 9.01 | 8.97 | 0.13* | 9.82 | 0.13* | — | 25.0 | 8.0 | 5.2 | — | — |
| A.P. | 722 | 728 | 731 | 725 | 735 | 733 | 639 | 721 | 695 | 705 | 720 |
| St.P. | 677 | 683 | 685 | 682 | 690 | 689 | 593 | 674 | 640 | 658 | 678 |
| 100 | 1487 | 1480 | 1490 | 1518 | 1484 | 1515 | 1595 | 1552 | 1634 | 1573 | 1625 |
| Liq. | 1090 | 1080 | 1100 | 1105 | 1115 | 1105 | 986 | 1100 | 1041 | 1001 | 1080 |
| Vis. | 7.2 | 8.8 | 3.6 | 3.6 | 2.4 | 4.5 | 180 | 10 | 10 | 13 | 25 |
| W.L. | 0.09 | 0.09 | 0.12 | 0.15 | 0.11 | — | 12 | 0.25 | 4 | 0.2 | 0.09 |

*Impurities in batch materials.

TABLE II

| (Mole %) | | | | | | | | | | | |
|---|---|---|---|---|---|---|---|---|---|---|---|
| | 1 | 2 | 3 | 4 | 5 | 6 | 7059 7 | 1724 8 | 1733 9 | 10 | 11 |
| $SiO_2$ | 63.4 | 63.4 | 63.4 | 63.4 | 63.4 | 63.5 | 63.3 | 62.8 | 65.0 | 65.0 | 66.0 |
| $Al_2O_3$ | 8.81 | 8.81 | 8.81 | 8.81 | 8.81 | 8.82 | 8.01 | 10.7 | 10.4 | 9.91 | 9.91 |
| $B_2O_3$ | 2.13 | 2.13 | 2.13 | 2.13 | 2.13 | 2.14 | 16.1 | 4.6 | 12.3 | 5.66 | 4.66 |
| CaO | 19.5 | 21.7 | 19.5 | 17.3 | 21.7 | 21.7 | — | 9.22 | 4.91 | 13.8 | 13.8 |
| MgO | 2.22 | — | — | — | — | — | — | 9.22 | 2.45 | — | — |
| SrO | — | — | 6.13 | 3.91 | 3.91 | 3.92 | — | — | 2.45 | — | — |
| BaO | 3.91 | 3.91 | — | 4.43 | — | — | 12.5 | 3.46 | 2.45 | 5.66 | 5.66 |
| RO | 25.63 | 25.61 | 25.63 | 25.64 | 25.61 | 25.62 | 12.5 | 21.9 | 12.26 | 19.46 | 19.46 |

Examples 1-6 represent glass compositions coming within the ranges of the present invention and Examples 7-11 are included as comparative glasses to illustrate the criticality of composition control to yield glasses

| $Al_2O_3$ | 8-10 | SrO | 0-12 |
|---|---|---|---|
| $B_2O_3$ | 1-4 | BaO | 0-9 |

| | | -continued | |
|---|---|---|---|
| CaO | 11-24 | CaO + MgO + SrO + BaO | 23-28. |

2. A flat panel display device according to claim 1 wherein said glass consists essentially of:

| SiO$_2$ | 61-64 | MgO | 0-3 |
|---|---|---|---|
| Al$_2$O$_3$ | 8-9 | SrO | 0-9 |
| B$_2$O$_3$ | 1-3 | BaO | 0-7 |
| CaO | 12-22 | CaO + MgO + SrO + BaO | 25-26. |

* * * * *

UNITED STATES PATENT AND TRADEMARK OFFICE
CERTIFICATE OF CORRECTION

PATENT NO. : 5,116,788

DATED : May 26, 1992

INVENTOR(S) : William H. Dumbaugh, Jr.

It is certified that error appears in the above-indentified patent and that said Letters Patent is hereby corrected as shown below:

Column 1, line 16, insert after $1.5 \times 10^5$ "poises, and have".

Column 1, line 56, change "configuration" to --configurations--.

Column 2, line 23, change "hibiting" to --exhibiting--.

Column 2, line 55, remove the semi-colon before the word "invention".

Column 3, line 4, change "$155^\circ C$" to --$1550^\circ C$--.

Column 3, line 34 after "which" insert --crystals are observed. The viscosity corresponding to this--.

Signed and Sealed this

Twenty-fourth Day of August, 1993

Attest:

BRUCE LEHMAN

Attesting Officer     Commissioner of Patents and Trademarks